United States Patent [19]

Thomas et al.

[11] Patent Number: 4,458,792
[45] Date of Patent: Jul. 10, 1984

[54] AUTOMOTIVE RETARDER

[75] Inventors: Wolfram Thomas, Winnenden; Wolfgang Zaiser, Steinheim, both of Fed. Rep. of Germany

[73] Assignee: Daimler-Benz Aktiengesellschaft, Fed. Rep. of Germany

[21] Appl. No.: 319,031

[22] Filed: Nov. 6, 1981

[30] Foreign Application Priority Data

Nov. 7, 1980 [DE] Fed. Rep. of Germany ....... 3042017

[51] Int. Cl.³ ...................... F16D 57/02; F16H 57/10
[52] U.S. Cl. .................................. 188/296; 188/293; 192/4 B; 192/58 A; 60/360
[58] Field of Search ............... 188/290, 292, 293, 295, 188/296, 264 E; 60/364, 359, 360, 334, 353; 192/58 A, 58 R, 4 B, 12 A

[56] References Cited

U.S. PATENT DOCUMENTS

| 1,640,608 | 8/1927 | Klimek | 192/58 A |
| 2,987,887 | 6/1961 | Fowler | 60/359 |
| 3,270,838 | 9/1966 | Schweizer | 188/296 |
| 3,952,508 | 4/1976 | Bopp | 188/296 |
| 4,043,434 | 8/1977 | Braschler | 188/296 |

FOREIGN PATENT DOCUMENTS 1480332  3/1970  Fed. Rep. of Germany .

Primary Examiner—Bruce H. Stoner, Jr.
Assistant Examiner—Robert J. Oberleitner
Attorney, Agent, or Firm—Craig & Burns

[57] ABSTRACT

An automotive retarder in which an outer toroid of at least one inner hydrodynamic operating cycle is bounded by inner surfaces of shells of at least two impellers engaged in the operating cycle. One of the impellers is adapted to be positioned by a thrust torque with another impeller by a counter support torque. The shell of the impeller which can be positioned by the thrust torque is provided with at least one aperture to reduce losses under idling conditions of the retarder. An annular slide valve is arranged concentrically with respect to an axis of rotation of the retarder with a sealing surface being provided on the valve which is stationary with respect to the valve. The annular slide valve may be displaced relative to the outlet aperture into a braking position such that the outlet aperture is closed off by the sealing surface of the annular slide valve and into at least one idling position unblocking the outlet opening to a greater or lesser extent. The associated sealing surface has an outline or configuration corresponding to the outer toroid and, in a braking position, the sealing surface is at least approximately flush with an inner surface of the shell of the impeller adapted to be positioned by the thrust torque.

8 Claims, 3 Drawing Figures

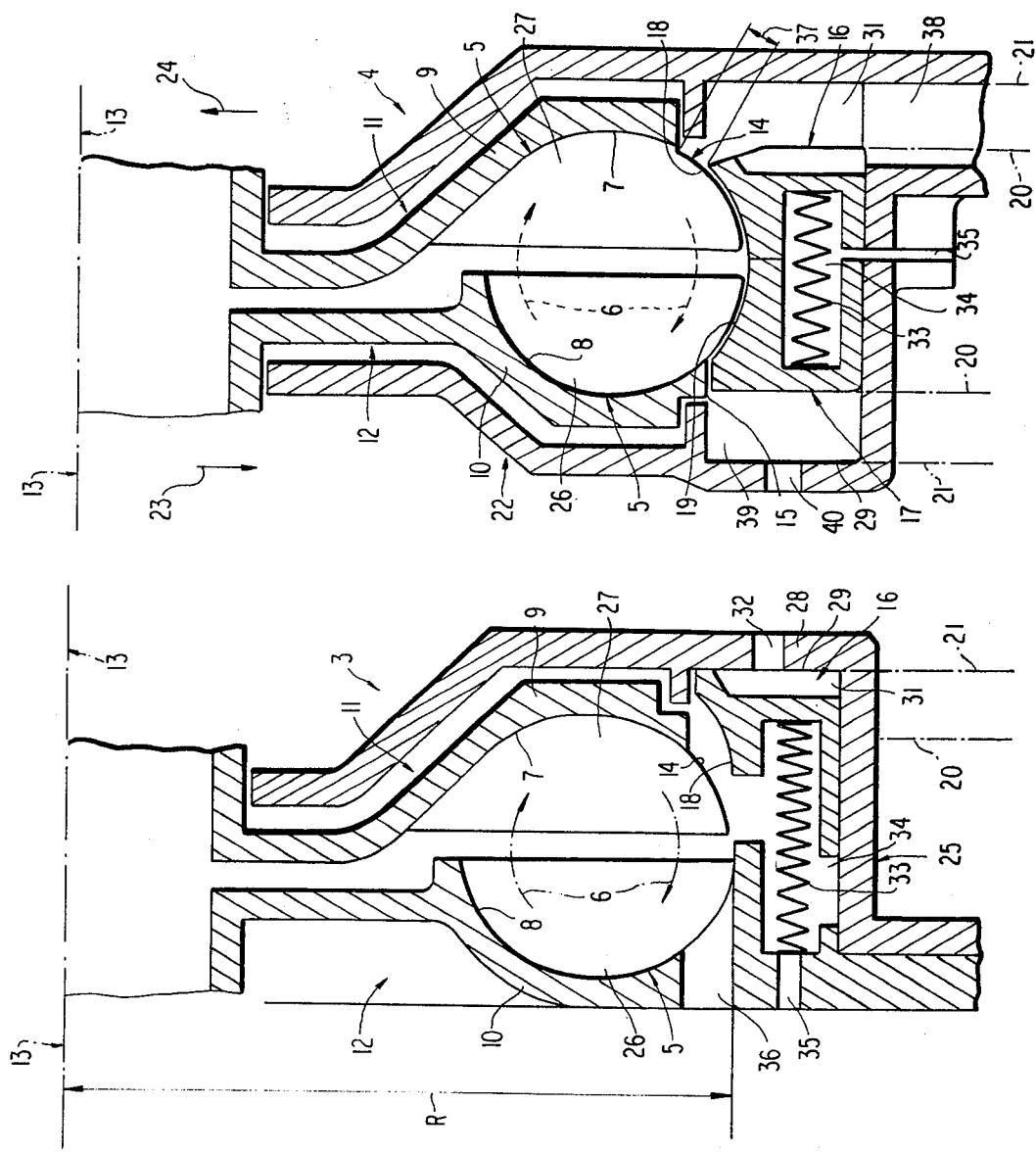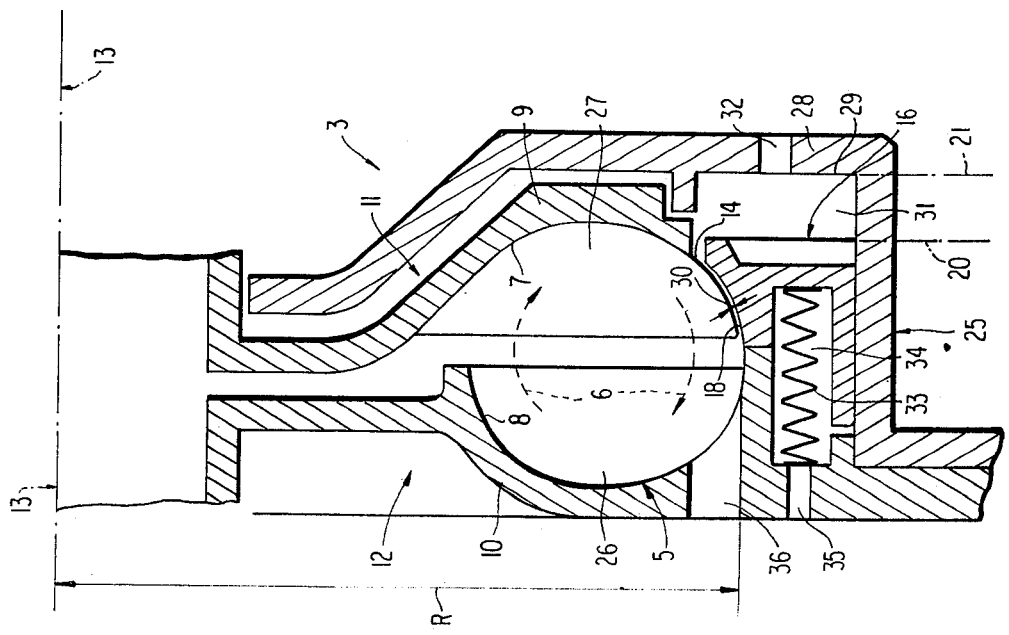

AUTOMOTIVE RETARDER

The present invention relates to a retarder and, more particularly, to an automotive retarder in which an outer toroid of at least one inner hydroynamic operating cycle is bounded by inner surfaces of shells of at least two impellers engaged in the operating cycle, in which one impeller may be positioned by a thrust torque and another impeller by a counter support torque, and in which an outer area, positioned radially relative to a rotational axis of the shell, of at least one shell is provided with at least one outlet aperture to reduce losses during idling conditions and an annular slide valve arranged centrally with respect to an axis of rotation, in addition to a sealing surface stationary relative to the annular slide valve. One impeller may form a stator. The annular slide valve may be displaced relative to the outlet aperture into a breaking position such that the outlet aperture is closed off by sealing surfaces of the annular slide valve and into at least one idling position unblocking an outlet opening to a greater or lesser extent.

In order to reduce performance losses during idling, a retarder of the aforementioned type is proposed in, for example, Offenlegungsschrift 14 80 332, with the retarder being generally equipped with two impellers, and outlet apertures provided in a shell of the impeller constructed as a non-rotating stator. In this proposed construction, performance losses resulting from a head of the other impeller functioning as a pump are largely uneffected. In this proposed retarder construction, a sealing surface and mouths or openings of the outlet aperture which are covered by a sealing surface are in cylindrical planes concentric with respect to the axis of rotation, with the planes having a diameter which is approximately larger by a wall thickness of the shell than the axis. When the annular slide valve is in its braking position, the outlet apertures are maintained in a sealed condition at the mouths of the outlet aperture by the sealing surface constituted by open convexities in a direction of the outer toroid which interfere, at the point of greatest power transfer capability with the flow of the hydrodynamic fluid in the hydrodynamic operating cycle. Thus, a disadvantage of this proposed construction resides in the fact that the braking power of the retarder is reduced by the outlet apertures.

The aim underlying the present invention essentially resides in providing an automotive retarder which reduces idling losses without impairing braking power.

In accordance with advantageous features of the present invention, a shell of the impeller which may be positioned by a thrust torque is provided with at least one outlet aperture and an associated sealing surface exhibits an outline of the outer toroid, with the sealing surface, in a braking position, being at least approximately flush with an inner surface of the shell of the impeller positionable by the thrust torque.

By virtue of the features of the present invention, it is possible to achieve a significant reduction in idling losses of the retarder through a considerable decrease in the head of the impeller functioning as a pump by the outlet apertures of the pump shell. When the retarder of the present invention is in a braking operation no power whatsoever is lost since the sealing surface fits into an outline of the outer toroid thereby eliminating any disruption of the flow of the hydraulic fluid in the hydrodynamic operating cycle in an area of the outlet apertures.

In accordance with further features of the present invention, an impeller which is adapted to be positioned by a support torque may be driven with respect to a non-rotating retarder housing in a direction opposite to the impeller positionable by the thrust torque, and shells of the two impellers may be provided with at least one outlet aperture and two annular slide valves associated with the outlet aperture of a shell are contained in a housing of the retarder, with sealing surfaces of the outlet aperture of the shell associated with the counter impeller not only exhibiting an outline of the outer toroid but also at least approximately flush with an inner surface of the shell of the counter impeller in a braking position of the associated annular slide valve.

By virtue of the last noted features of the present invention, the braking efficiency is considerably increased by a reverse drive direction of the impeller positionable by the support torque and the power losses in the idle state are maintained at a low level by arranging the outlet apertures on both impellers.

Accordingly, it is an object of the present invention to provide an automotive retarder which avoids, by simple means, shortcomings and disadvantages encountered in the prior art.

Another object of the present invention resides in providing an automotive retarder which considerably reduces idling losses without impairing a braking power of the retarder.

A still further object of the present invention resides in providing an automotive retarder which functions realiably at all stages of operation.

These and other objects, features, and advantages of the present invention will become more apparent from the following description when taken in connection with the accompanying drawings which show, for the purpose of illustration only, two embodiments in accordance with the present invention, and wherein:

FIG. 1 is a partially schematic axial cross sectional view of a first embodiment of an automotive retarder constructed in accordance with the present invention;

FIG. 1a is a cross sectional view corresponding to FIG. 1 with the automotive retarder being in an idling condition; and FIG. 2 is a partially schematic axial cross sectional view of a second embodiment of a retarder constructed in accordance with the present invention.

Referring now to the drawings wherein like reference numerals are used throughout the various views to designate like parts and, more particularly, to FIGS. 1 and 1a, according to these figures, an automotive retarder generally designated by the reference numeral 3 includes a two part non-rotating retarder housing generally designated by the reference numeral 25, with one half or one portion of the housing 25 being constructed as an impeller generally designated by the reference numeral 12 forming a stator. For this purpose, a shell 10 provided with stator blades 26 is provided which interacts with pump blades 27 of a shell 9 of an impeller generally designated by the reference numeral 11 enclosed in the other half or portion 28 of the retarder housing 25. In a manner not shown in the drawings, the impeller 11 may be positioned by means of a thrust torque generated by wheels of a vehicle (not shown) in which the retarder is employed. The impeller blades 26, 27 produce an internal hydrodynamic operating cycle 6 having an outer toroid generally designated by the reference numeral 5 geometrically bounded by inner surfaces 7, 8 of the shells 9, 10.

Outlet apertures 14 are provided and, to form such outlet apertures 14, a wall of the shell 9 has a diameter, with respect to an axis of rotation generally designated by the reference numeral 13—13 of the retarder 3, which is less than a diameter of the associated pump blades. An annular slide valve generally designated by the reference numeral 16 is arranged concentrically with respect to the axis of rotation 13—13, with the slide valve 16 being adapted to move in directions of the axis of rotation 13—13 within a corresponding annular space 29 of the housing half 28.

The annular slide valve 16 is provided with a sealing surface 18 exhibiting or having an outline of the outer toroid 5. In the diagrammatically illustrated braking position designated 20, the annular valve 16, with its associated sealing surface 18 seals the outlet apertures 14 and is flush with the inner surface 7 of the shell 9, while an extremely narrow annular gap 30 is provided between the annular valve 16 and pump blades 27. The provision of the annular gap 30 eliminates any disruption of the flow of the operating cycle 6 at the outer toroid 5 where the outlet apertures are located.

The section of the annular space 29 enclosed between the annular slide valve 16 and housing half 28 forms a pressure chamber 31 which, by way of a chamber connection 32, may be placed under a control pressure which may, for example, be taken from the retarder brake pressure. On a side of the annular slide valve 16 facing away from the pressure chamber 31, a compression spring 33 is located in recesses aligned with the annular slide valve 16 and the stator 12 exerts a pressure on the annular slide valve 16. The force of the control pressure in the pressure chamber 31 moves the annular slide valve 16 into the braking position 20 and, after a removal of the control pressure in the pressure chamber 31, the force of the compression spring 33 moves the annular slide valve 16 into an idle position 21 shown most clearly in FIG. 1a.

When the annular slide valve 16 is in the idle position 21, the outlet apertures 14 are connected to a section 34 of the annular space 29 enclosed between the stator 12 and annular slide valve 16 in such a manner that the pump blades 27 cause the air and liquid particles circulating in the operating cycle 6 during an idling of the retarder 3 to move into the section 34 so that the idling losses can be considerably reduced thereby. The section 34 may be connected to outside air by way of a suitable bore or connection 35. Air rebounding into the blade space of the shell 9 from the section 34 effects a further reduction of a power loss of the retarder 3.

Axially extending outlet apertures 36 are provided in an outer radial area of the shell 10 of the stator 12 to divert a portion of the operating liquid during braking from the inner operating cycle 6 and to feed the operating liquid to an outer cycle for cooling purposes.

As shown in FIG. 2, a retarder generally designated by the reference numeral 4 is provided with two impellers 11, 12 each rotating in directions 24 or 23 opposite to each other. The two impellers 11, 12, as with the embodiment described hereinabove, are enclosed in the two-section non-rotating retarder housing 22. In the construction of FIG. 2, the impeller 11 which may be positioned by a thrust torque developed by wheels of a vehicle, drives the impeller 12 by way of a reversing driving gear such as, for example, a planetary drive gear. In contradistinction of the retarder 3, the shell 10 of the impeller 12 of the retarder 4 running in a direction opposite to that of the impeller 11 is provided with outlet apertures 15 which are sealed by a sealing surface 19 of a second annular slide valve generally designated by the reference numeral 17, when the second slide valve 17 is in a braking position 20.

In lieu of outlet apertures 36, of FIGS. 1 and 1A, for a cooling cycle, in the construction of the retarder 4, a free annular gap 37 is provided at the outlet apertures 14 of the shell 9, with the free annular gap 37 being left open by the sealing surface 18 of the annular slide valve 16, when the annular slide valve 16 is in the braking position 20. In this situation, the pressure chamber 31 to which the annular gap 37 is open, is connected to the outer cooling cycle by way of a housing connection 38. The second annular slide valve 17 divides the annular space 29 of the retarder housing 22 into an additional pressure chamber 39 which may be connected to the pressure chamber 31 by way of a housing connection 40 in a manner not shown in detail in the drawings.

In the braking position 20, the sealing surface 19, having an outline or configuration of the outer toroid 5 is approximately flush with the inner surface 8 of the shell 10 and the annular slide valve 16, 17 function in the same manner as the annular slide valve 16 described hereinabove in connection with the retarder 3. In all other respects, the two retarders 3, and 4 are identical; therefore, the above description in connection with the retarder 3 applies equally to the retarder 4 of FIG. 2.

While we have shown and described two embodiments in accordance with the present invention, it is understood that the same is not limited thereto but is susceptible of numerous changes and modifications as are known to one having ordinary skill in the art and we therefore do not wish to be limited to the details shown and described herein, but intend to cover all such modifications as are encompassed by the scope of the appended claims.

We claim:

1. An automotive retarder in which an outer toroid of at least one inner hydrodynamic operating cycle is bounded by inner surfaces of shells of at least a first and a second impeller means engaged in the operating cycle, the first impeller means is adapted to be positioned by a thrust torque and the second impeller means is adapted to be positioned by a counter support thrust, and means for reducing losses under idling conditions of the retarder, characterized in that the means for reducing losses includes at least one outlet means provided in the shell of the first impeller means, means for selectively sealing the outlet means including a sealing surface means displacable between a braking position closing off the outlet means and an idling position opening the outlet means a predetermined amount, the sealing surface means has a configuration of at least approximately a contour of the outer toroid, and in that the sealing surface means is approximately flush with the inner surface of the shell of the first impeller means when the sealing surface means is in the braking position.

2. An automotive retarder according to claim 1, characterized in that the at least one outlet means is provided in the shell of the first impeller means at a radially outer position of the shell with respect to an axis of rotation of the retarder.

3. An automotive retarder according to claim 2, characterized in that the sealing surface means is provided on an annular slide valve means disposed concentrically with respect to the axis of rotation of the retarder.

4. An automotive retarder according to one of claims 1, 2, or 3, characterized in that the retarder includes a non-rotating retarder housing means, the second impeller means is adapted to be driven in a direction opposite a direction of rotation of the first impeller means, the means for reducing losses further includes at least one further outlet means provided in the shell of the second impeller means, and means for selectively sealing the further outlet means including a further sealing surface means disposed between a braking position closing the further outlet means and an idling position opening the further outlet means a predetermined amount, the further sealing surface means has a configuration at least approximating a contour of the outer toroid, and in that the further sealing surface means is approximately flush with the inner surface of the shell of the second impeller means when the further sealing surface means is in the braking position.

5. An automotive retarder according to claim 4, characterized in that means are provided in an area of the at least one outlet means in the shell of the first impeller means for eliminating any disruption in a flow of the operating cycle in an area of said last mentioned outlet means.

6. An automotive retarder according to claim 5, characterized in that the means for eliminating any disruption in a flow of the operating cycle includes a narrow annular gap formed between an edge of a blade of the first impeller means and the associated sliding surface means.

7. An automotive retarder according to claim 4, characterized in that the retarder housing means includes a pressure chamber means, the first mentioned sliding surface means and further sliding surface means are disposed in said pressure chamber means, and in that means are provided for supplying control pressure to the pressure chamber means so as to enable the positioning of both of the sliding surface means.

8. An automotive retarder according to claim 7, characterized in that means are provided for communicating the pressure chamber means with an outer cooling cycle.

* * * * *